March 1, 1966 B. A. PEARSON 3,237,718
TWO-SIDED SUSPENSION SYSTEM FOR STAGING
Filed May 13, 1964 6 Sheets-Sheet 3

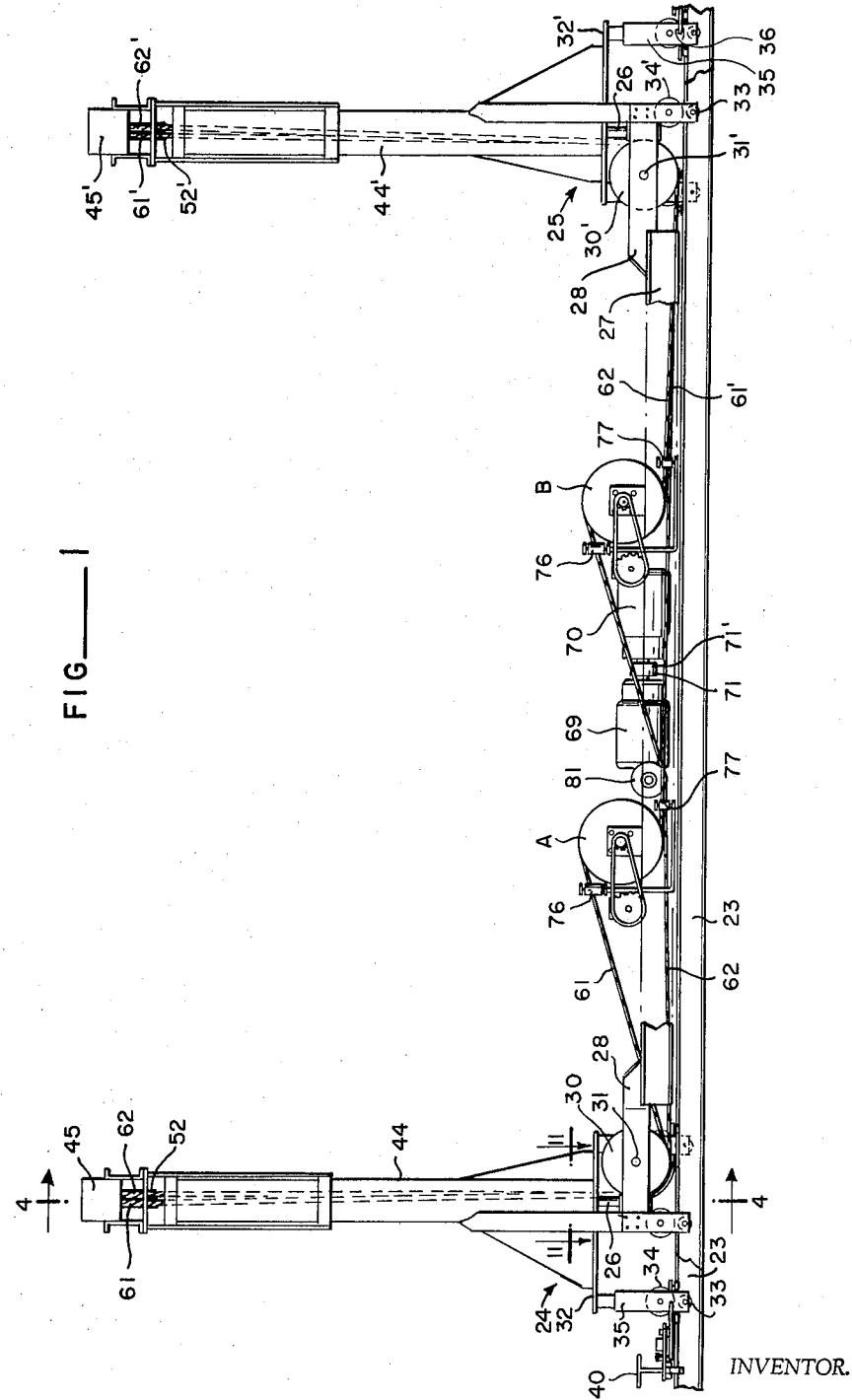

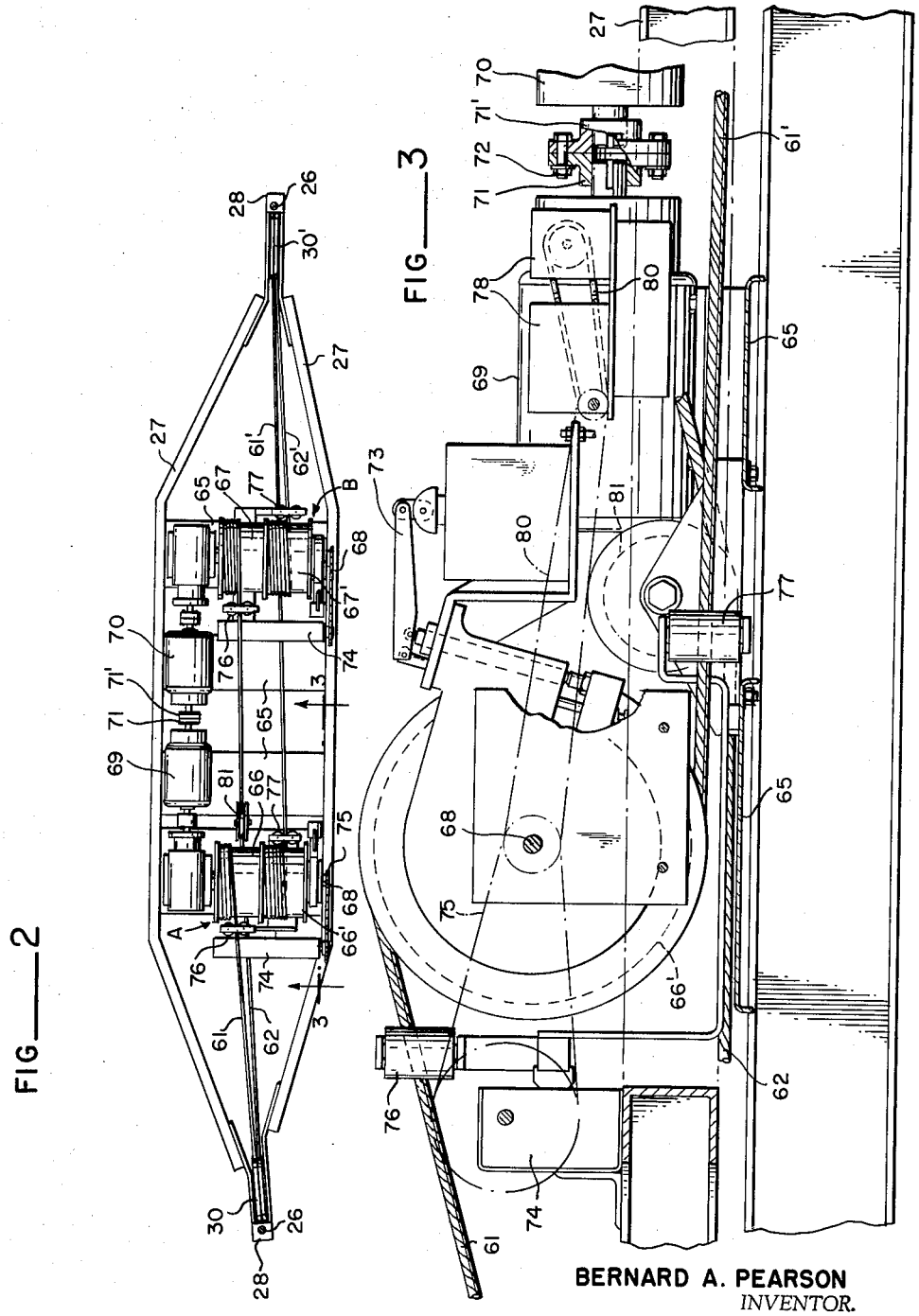

INVENTOR.
BERNARD A. PEARSON
BY Seed & Berry
ATTORNEYS

BERNARD A. PEARSON
  INVENTOR.

BY *Seed & Berry*

ATTORNEYS

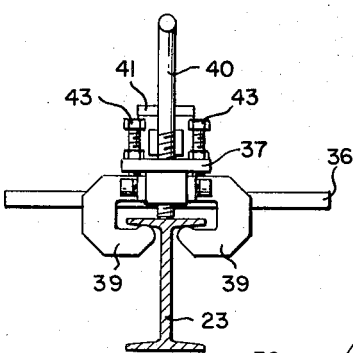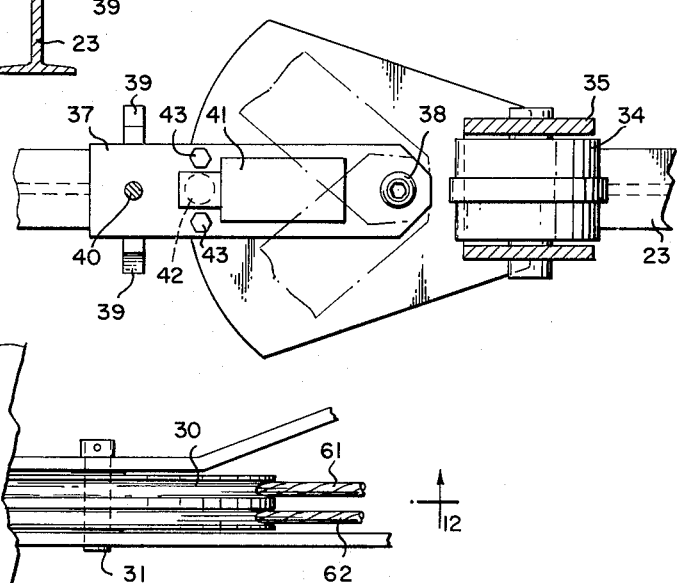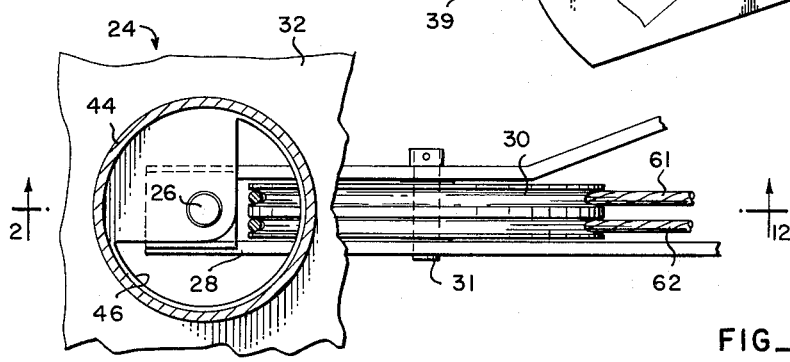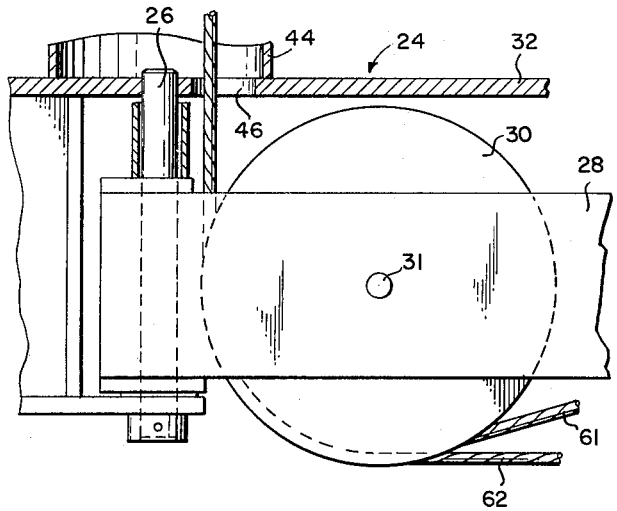

NOMENCLATURE

IH, 2H — HOIST CONTACTOR
IL, 2L — LOWER CONTACTOR
CF — CONTROL FUSE
SCLS — SLACK CABLE LIMIT SW.
OL — OVERLOAD RELAYS
HLS — HOIST LIMIT SWITCH
LLS — LOWER LIMIT SWITCH
OSS — OVERSPEED SWITCH
TCLS — TRACK CLAMP LIMIT SWITCH

BERNARD A. PEARSON
*INVENTOR.*

BY *Seed & Berry*

*ATTORNEYS*

United States Patent Office 3,237,718
Patented Mar. 1, 1966

3,237,718
TWO-SIDED SUSPENSION SYSTEM FOR STAGING
Bernard A. Pearson, Seattle, Wash., assignor to
Ederer Corporation, Seattle, Wash., a corporation
of Washington
Filed May 13, 1964, Ser. No. 367,145
10 Claims. (Cl. 182—36)

This invention relates to motorized staging systems of the type which is used to clean, paint and otherwise service building exteriors.

One important object of the invention is to provide a staging system in which the stage therefor has each of its two ends suspended by a pair of cables so that the stage will continue to have support even though one cable should break, and characterized in that twin double-drums are provided on which the cables are wound, the two spooling surfaces of one double-drum respectively accommodating one cable from each of the two pairs of cables and the two spooling surfaces of the other double-drum respectively accommodating the other cable from each of said two sets of cables.

A further principal object of the invention is to provide a staging system having separate electric motors for driving each of the two double-drums, with means for coupling or uncoupling the motors at will so that, coupled, the two double-drums will turn in exact synchronization and either motor can be made to drive both drums should one of the two motors become shorted or otherwise rendered inoperative and, uncoupled, one motor can continue to operate as the power source for its related double-drum while repairs are being made upon the other motor or any functioning part related thereto.

As a further object still the invention aims to provide a staging system in which a carrier travelling along a trackway and serving as a footing for davits from which the stage is suspended, and as a mounting for the winding drums and the motors, is equipped with an improved track-clamping device for holding the carrier immobile upon the track, and wherein limit switches are provided within the electric motor circuit operatively interconnected with the clamping device in a manner such that the circuit to the motor can be completed only when the carrier is held immobile.

A still additional object of the invention is to provide a staging system having a perfected form of boom arm for its stage-suspending davits.

The foregoing and other objects and advantages in view will appear and be understood in the course of the following description and claims, the invention consisting in the novel construction and in the adaptation and combination of parts hereinafter described and claimed.

In the accompanying drawings:

FIGURE 1 is a side elevational view illustrating a motorized staging system constructed to embody preferred teachings of the present invention, the vantage point being the roof of a building on which the staging system is installed. Track rails for the carrier of the staging system are shown fragmentarily.

FIG. 2 is a top plan view of the carrier proper, deleting the two wheeled trucks on which the same is mounted.

FIG. 3 is a fragmentary longitudinal vertical sectional view drawn to an enlarged scale on line 3—3 of FIG. 2.

FIG. 9 is a transverse vertical sectional view thereof.

FIG. 10 is a fragmentary horizontal sectional view on line 10—10 of FIG. 8.

FIG. 11 is a large-scale fragmentary horizontal sectional view on line 11—11 of FIG. 1.

FIG. 12 is a fragmentary longitudinal vertical sectional view on line 12—12 of FIG. 11.

Figure 4:
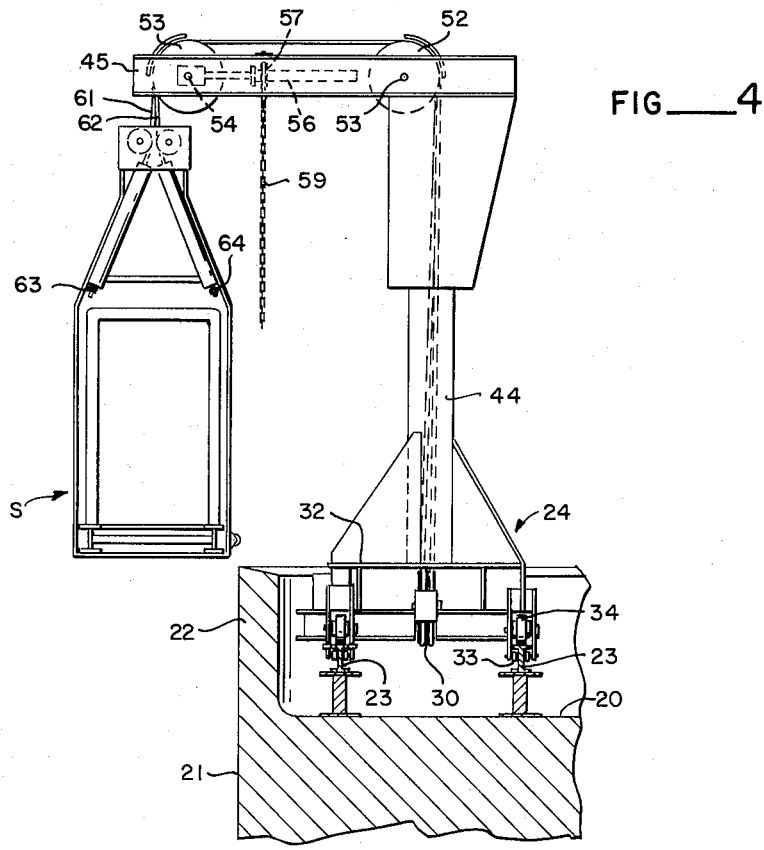
FIG. 4 is a transverse vertical sectional view on line 4—4 of FIG. 1.
Figure 5:
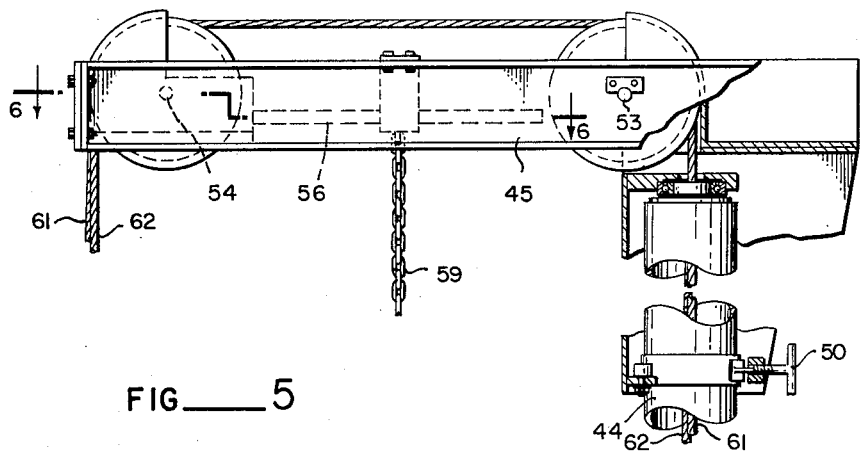
FIG. 5 is a fragmentary transverse vertical sectional view illustrating the head end of one of the davits, with the scale enlarged from that of FIG. 4.

The flat roof of a building on which the apparatus of the present invention is installed is indicated in FIG. 4 of the drawings by the numeral 20. Denoted by 21 is a sidewall, which rises above the level of the roof to form a parapet 22.

A continuous 2-rail trackway is sustained upon the roof. This trackway comprises a number of straight sections joined at the corners of the building by moderately tight curves and other than for such curves the trackway lies in closely spaced paralleling relation to the parapet. I-beams 23 are used for the rails.

Mounted for travel on the trackway is a carriage comprised of two wheeled trucks 24 and 25 pivoted by king pins 26 to the two ends of a linking frame. The frame, in addition to its linking function, serves as a bed for the mounting of winch mechanisms hereinafter described, and is comprised of longitudinal principals 27—27 spaced rather widely through the central part of the frame and at each of the two ends converging inwardly for connection with parallel branches of a respective terminal tree 28. The king pins 26 are carried by the trees at the outer ends thereof. In the slot provided between said branches of each tree, a respective double-grooved sheave, as 30 and 30', is journal-mounted by a pin 31 for rotation about a transverse horizontal axis.

Each of the two trucks functions as the supporting foot for a respective one of two davits. The two davits, and the two wheeled trucks, are alike in construction. Primes of the ordinals applied to the component parts of one will be used to designate the corresponding component parts of the other.

The wheels for the trucks are in three sets, three wheels to a set. Two of these wheel-sets track on one of the two rails of the trackway, one set located at one end extremity and the other set at the other end extremity of one side of the truck. The third wheel-set tracks on the other rail of the trackway, being placed to occupy a transverse vertical plane lying between said two wheel-sets and projected normal to the longitudinal vertical plane occupied by the latter two sets. The truck provides a deck-plate 32 from which wheel-carrying hangers are suspended, the suspensions permitting the hangers for the two wheel-sets related to the one rail to each swivel about a vertical axis. Should the two rails have the particular curvature on the corners illustrated and described in pending patent application of Howard W. Wylie, deceased, to Motorized Staging Suspension and Adjusting Carrier, Ser. No. 240,480, filed November 27, 1962, the hanger for the single wheel set can be rigid with the deck plate. Given a true paralleling relationship of the rails at the curving corners, the suspension for such single wheel-set should then be one which allows the hanger therefor to swing about a longitudinal horizontal axis. As above stated, each wheel-set comprises three wheels. Two wheels 33—33 are located one at one side and the other at the other side of the web of the concerned track rail in rolling contact with a related upper flange of the rail. The third wheel 34 rides on the top face of the track rail in median relation to the wheels 33—33.

Figure 13:
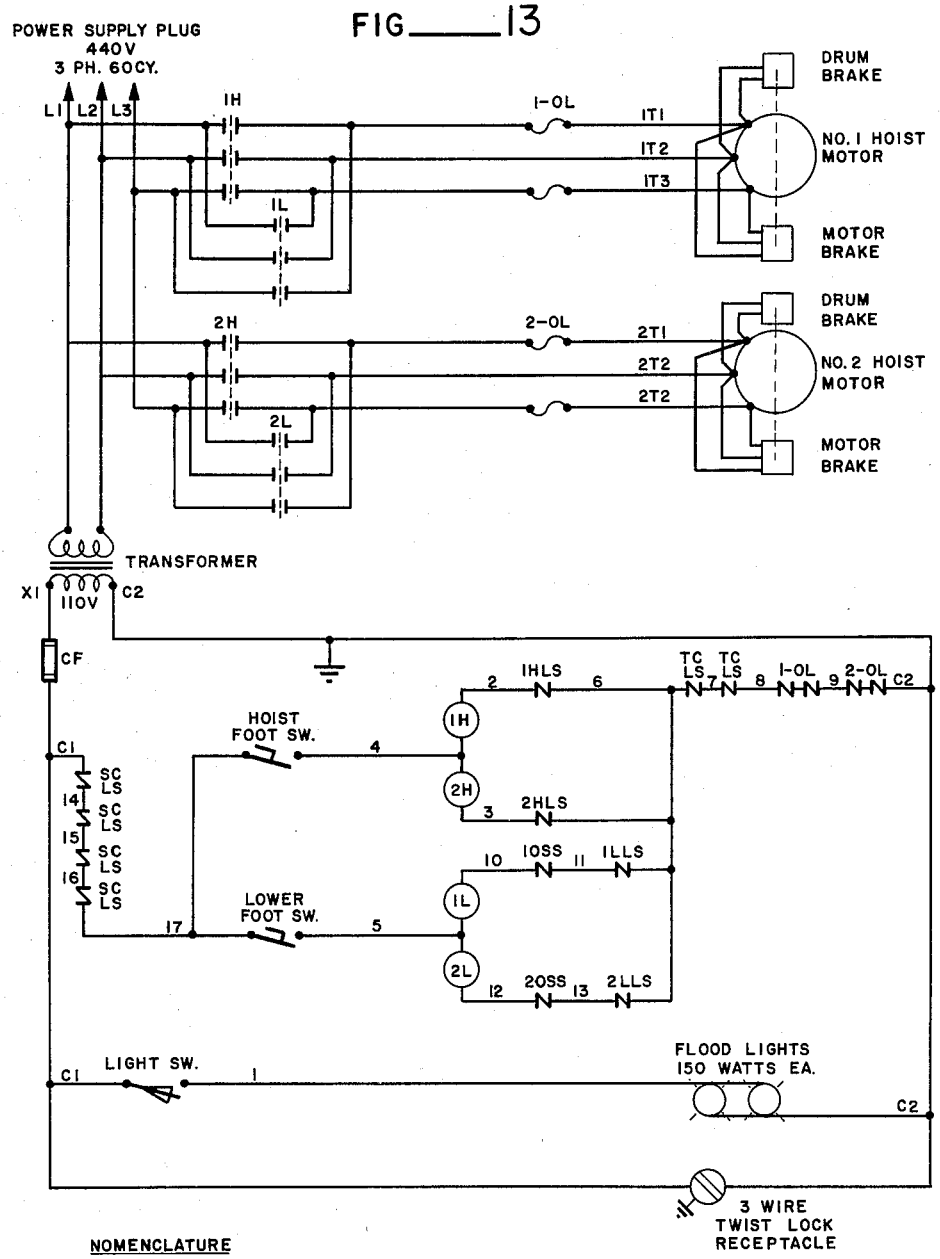
FIG. 13 is an elementary diagram of a suitable wiring circuit for the staging system of the present invention.

Denoted by 35, the outer of the two swivel-mounted wheel hangers has a horizontal bar 36 welded or otherwise rigidly secured thereto. This bar overlies the related track rail. A lever arm 37 has its inner end fulcrumed to said bar 36 and projects by its outer end beyond the bar so as to overhang the rail, and upon said projecting end presents two rail-straddling hooks 39 acting in complement with a screw 40 to produce a substantial C-clamp or, more properly, two C-clamps one functional to one and the other to the other of the rail's two upper flanges. The box 41 for a limit switch surmounts the lever arm. Normally open, the limit switch is closed by spring-urged downward motion of a toe-piece 42 reflecting an elevation of the lever arm 37 as the clamping screw 40 draws the hooks upwardly against the rail. Two set-screws 43 carried by the lever arm and arranged to bear against the mounting bar 36 prescribe for the lever arm a normal rest position which establishes clearance between the clamping screws and the rail when the screw is backed off. It will be seen from an inspection of FIG. 4 that each end of the carrier is equipped with one of the rail clamps. The two limit switches (see FIG. 13) are wired into series electric circuits including control switches for reversible motors which drive spooling drums of the above-mentioned winch mechanism.

Each davit comprises a standard 44 and a boom arm 45. The standard is rigid with the deck plate 32 or 32', as the case may be, and is a tubular member open at the ends and placed so that its axis coincides with the pivotal axis of the related king pin. A cut-out 46 in the deck plate gives access to and from the hollow interior of the standard for cables passing over the grooves of the related sheave 30 or 30', the cut-out having an arcuate shape, developed about the rotary axis of the king pin as a center, in compensation of the swivelling of the truck relative to the bed of the carriage as the carriage negotiates curves in the track.

Figure 6:
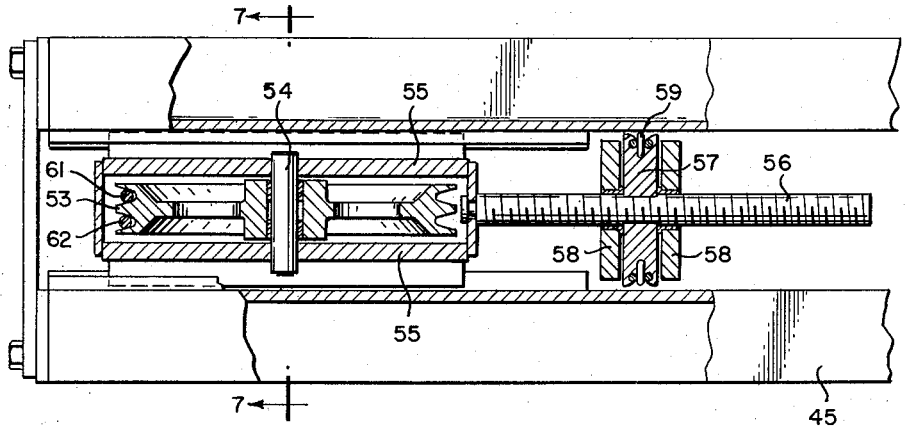
FIG. 6 is a fragmentary horizontal sectional view drawn to an enlarged scale on line 6—6 of FIG. 5.
Figure 7:
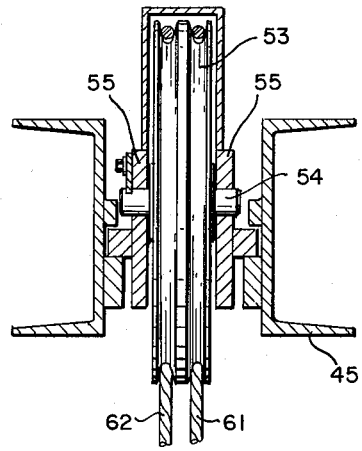
FIG. 7 is a transverse vertical sectional view on line 7—7 of FIG. 6.
Figure 8:
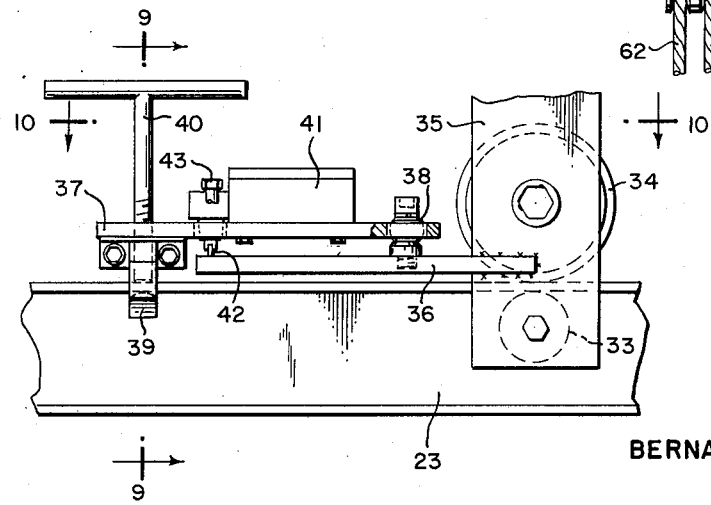
FIG. 8 is a large-scale fragmentary side elevational view detailing the rail-clamping structure.

The boom is journaled upon the head end of the standard for turning movements about the center of the latter as an axis, and is fitted with a clamp 50 for setting the boom in selected rotatively adjusted positions. When pointed in an outboard direction, the outer end of the boom projects beyond the parapet. The boom is a fabricated structure employing, for its horizontal arm, two paralleling channel members spaced apart back-to-back. Double-grooved sheaves 52 and 53, respectively, are received in the space between these channel members at the inner and outer ends of the boom, with each sheave being journaled by a respective pin, as 53 and 54, for rotation about a horizontal axis transverse to the boom. Pin 53 traverses the two channel members of the boom. Pin 54 (see FIGS. 6 and 7) traverses spaced cheek-plates 55 of a cross-head which is mounted for motion endwise to the boom in a slide-way provided by the boom. A traveller screw 56 paralleling the slide axis of the slide-way and attached by a swivel connection to the cross-head threads through the center of a journaled sprocket wheel 57. The sprocket wheel, which is held by thrust plates 58 against displacement endwise to the boom, has the upper bight of an endless hanging chain 59 caught over the same so as to impart in-and-out adjusting movement to the cross-head. The purpose of such adjusting movement is perforce that of shifting a cable-suspended staging S to properly position the latter in relation to the building side wall on which work is being performed. Two pairs of cables suspend the staging. One pair 61–62 are trained over the three double-grooved sheaves 30, 52 and 53 of one davit and are dead-ended, as at 63 and 64, to one end of the staging S. The other pair are trained over the corresponding three double-grooved sheaves which are related to the other davit and are similarly dead-ended to the staging's other end.

Proceeding now to describe the winch mechanisms, it will be seen from an inspection of FIG. 2 that cross-members 65 extending between the two longitudinal principals 27—27 of the carriage frame produce a platform. Two winch drums A and B are mounted upon the platform, one at one end and the other at the other end, each with its journal axis disposed horizontally and transverse to the carriage, and provided by each of these drums are two spooling surfaces, as 66–66' and 67–67'. Each drum is made fast to a live shaft, as 68 and 68', and driving these shafts through suitable reduction gearing, worm and wormwheel by preference, are respective reversible electric motors 69 and 70. These motors occupy coaxial positions at one side of the platform with the facing ends of their two armature shafts exposed. The components of a suitable detachable coupling, herein shown as flanged hubs 71–71' connected by bolts 72, are fitted upon such exposed ends of the armature shafts. Each of the two drums A and B is equipped with a respective brake solenoid-operated through suitable linkage 73 and has a level-wind 74 which is driven by a chain 75 from the related drum shaft. Driven reciprocally by each level-wind are an "overwind" fair-lead roller set 76 and an "underwind" fair-lead roller set 77, one functional to one and the other functional to the other of the two spooling surfaces of the related winding drum. "Hoist" and "lower" limit switches housed in boxes 78 and, like the above-described "track-clamp" limit-switches, wired in a series electric circuit including control switches for the electric motor 69 or 70, as the case may be, are synchronized to the related drum's rotation by drive chains 80. The control switches are usually foot-operated and are located upon the staging, with current being carried to and from the staging by electric cord.

From the sheave 30 the two cables 61 and 62 extend one to the spooling surface 66 of the proximal drum A and the other to the spooling surface 67 of the distal drum B, taking an overwind in each instance. In its travel below said proximal drum to and from said spooling surface 67 of the distal drum, the cable 62 is trained over a guide sheave 81. From the sheave 30' the two cables 61' and 62' extend one to the spooling surface 66' of the distal drum A and the other to the spooling surface 67' of the proximal drum B, taking an underwind in each instance. Level-winding of the cables upon the spooling surfaces is controlled by a respective one of the four reciprocally driven sets of fair-lead rollers, and namely by the two overwind sets 76 and the two underwind sets 77.

In normal hoist or lowering operations both of the electric motors are energized. The two drums turn in exact synchronization in that the components 71–71' of the coupling normally connect the two armature shafts of the motors so that the same turn as one. Should one of the four cables break the concerned end of the staging continues to receive support from the remaining one cable related to such end. Should either of the two motors become inoperative, the remaining motor can drive both drums in that the armature shafts are connected. However, either of the two drums can be inactivated by disconnecting the coupling between the motors. Both ends of the staging are then lowered and hoisted only by the single cable which is wound on the other or active drum. Any part or parts of either of the two sides of the winch system can thus be serviced or repaired, with or without removal from the carriage, without taking the staging out of service in that the other side of the system is self-sufficient to operate the staging.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In combination with a staging, a respective sheave means for each of the two ends of the staging lying overhead to the related end, a pair of winches providing spooling drums, respective pairs of cables trained over each of the sheave means with an outer end of each cable deadended to the related end of the staging, each of said pairs of cables having the inner ends of its two cables wound one upon the spooling drum of one winch and the other upon the spooling drum of the other winch of the pair of winches, the direction of wind being opposite as between the two cables which are wound on each winch, and power means for driving a selected one or both of the winches in either of two opposite directions, selectively, so that if only a selected one of the two winches is driven the related two cables can be either paid out or taken in selectively and if both winches are driven all four cables can be either paid out or taken in, selectively.

2. The structure of claim 1 in which the power means comprises separate reversible electric motors for each of the two winches each self-sufficient to power both winches and normally coupled so that the two armature shafts rotate as one, means being provided for disconnecting the coupling at will.

3. Structure according to claim 2 in which the armature shafts of the motors connect by reduction gearing with the spooling drums.

4. Structure according to claim 1 in which the spooling drums are mounted upon a platform, extending transversely thereof in paralleling side-by-side relation, and having sheave means at each of the opposite ends of the platform one guiding one pair of cables and the other guiding the other pair of cables between the spooling drums and the related one of said two overhead sheave means.

5. In combination with a staging, a carriage comprising wheeled trucks linked by a connecting platform, a rooftop trackway for the wheels of the trucks, a pair of davits one for each of the ends of the staging each footing upon a respective one of the trucks and having boom arms arranged to project outboard beyond the roof, a pair of winches mounted upon the platform each providing a respective spooling drum and a motor for driving the drum, the two spooling drums extending transversely of the platform in longitudinally spaced paralleling relation, a respective double-grooved sheave mounted at each end of the platform for rotation about a transverse horizontal axis, a respective double-grooved sheave mounted at the outer end of each davit's boom arm, respective pairs of cables wound by inner ends upon each of the two spooling drums, the outer end of one cable of each of said two pairs of cables being dead-ended to one end of the staging, the outer end of the other cable of each of said two pairs of cables being dead-ended to the other end of the staging, each of said four cables in its run between the end of the staging to which it is attached and the spooling drum on which it is wound being trained over the sheave of the related davit and the sheave which is mounted at the related end of the platform, and a coupling between the drive shafts of the two motors capable of being connected or disconnected at will.

6. The structure recited in claim 5 in which the two cables of each of said pairs of cables are wound upon separated spooling surfaces one lying at one end and the other at the other end of the drum with one cable taking an overwind and the other an underwind, and having a respective level-wind mechanism for each cable.

7. The structure recited in claim 5, the two motors being electric and located in co-axial relation at one side of the platform with each motor connected to its related drum by worm and worm-wheel reduction gearing.

8. The structure recited in claim 5, the two motors being electric, means being provided for clamping the carriage to a rail of the trackway and having a normally open limit switch closed by said act of clamping the carriage and contained in a series electric circuit including a manually operated switch for the motor circuit.

9. The structure recited in claim 5 in which the boom arms also have a double-grooved sheave mounted at the inner end and over which the cables are trained in their passage between the sheave which is mounted at the boom's outer end and the sheave which is mounted on the platform, the boom arm being adjustable for length and having means for setting the same at selected points within a permitted range of adjusting movement.

10. In combination with a staging, a carriage comprised of wheeled trucks swivelled by king-pins to a connecting platform, a trackway for the wheels of the truck, a pair of winches mounted upon the platform each providing a drum and a reversible motor for driving the drum, the two drums extending transversely of the platform in longitudinally spaced paralleling relation and each providing two separated spooling surfaces, a respective cable for each of said spooling surfaces having its inner end wound thereon, a respective hollow standard rigidly supported by the frame of each truck in a position placing its hollow center co-axial with the related king-pin, a respective boom-arm extending horizontally from the upper end of each standard, double-grooved sheaves mounted from the inner and outer ends of each boom arm and from each end of the platform in positions to guide cables through said hollow center of the standards between the spooling drums and the staging, two of the four spooled cables extending one cable from one spooling surface of one drum and the other cable from one spooling surface of the other drum through the hollow center of one of the two standards for dead-ending of the outer ends of the cables to one end of the staging, the other two spooled cables extending one cable from the other spooling surface of one drum and one cable from the other spooling surface of the other drum through the hollow center of the other of the two standards for dead-ending of the outer ends of the cables to the other end of the staging, an operative interconnection normally coupling the two motors so that the two drums are powered as one, and means for disengaging said coupling so as to selectively inactivate either of the two motors together with its drum.

References Cited by the Examiner

UNITED STATES PATENTS

| 1,300,647 | 4/1919 | Price | 187—71 |
| 1,605,079 | 11/1926 | Simmons | 187—71 |
| 2,163,172 | 6/1939 | Haase | 254—136 |

FOREIGN PATENTS

| 862,308 | 3/1961 | Great Britain. |

HARRISON R. MOSELEY, *Primary Examiner.*

REINALDO P. MACHADO, *Examiner.*